UNITED STATES PATENT OFFICE.

SAMUEL CABOT, JR., OF BOSTON, MASSACHUSETTS.

COMPOSITION FOR STAINING AND PRESERVING WOOD.

SPECIFICATION forming part of Letters Patent No. 297,568, dated April 29, 1884.

Application filed July 16, 1883. (Specimens.)

*To all whom it may concern:*

Be it known that I, SAMUEL CABOT, Jr., of Boston, in the county of Suffolk and State of Massachusetts, have invented certain new and useful Improvements in Compositions for Staining and Preserving Wood-Work; and I do hereby declare the following to be a full, clear, and exact description of the invention, such as will enable others skilled in the art to which it appertains to make and use the same.

My invention relates to an improvement in compositions for staining and preserving wood-work and carpentry which is exposed to the action of the elements, the composition being especially adapted to be applied to clapboards, and to the ornamental shingles now so much used by architects in the production of striking and novel effects.

The object of my invention is to produce a composition which, when applied to wood, will preserve and color or stain it without masking or concealing its natural grain.

With this object in view my invention consists in a composition composed of any of the heavy oils obtained from the distillation of tar, and of a pigment and a drier, or a single equivalent for both.

The oil or distillate which I employ in the preparation of my improved composition is obtained from the distillation of tar left after the destructive distillation of carbonaceous substances. Preferably I use the distillate which passes over between the temperatures of 125° and 200° centigrade. I also prefer to redistill this distillate to clarify it.

To prepare the compound I take, preferably, between ten and fifteen parts, by weight, of any finely-divided pigment—such as Venetian red, Oxford ochre, chrome-yellow, and all organic and mineral colors that are not altered by the air in the presence of the oily elements of the mixture—and grind it in a drier, preferably boiled linseed-oil. To this I add slowly about one hundred parts, by weight, of the refined tar-oil, which is thoroughly mixed with the pigment. In case the pigment is not ground in a drying-oil, a suitable quantity of any of the drying-oils is added to the mixture; but this is not necessary if the pigment is ground in boiled linseed-oil, as described. If desired, the pigment and drier may be replaced by a colored gum-resin, which will at once color the composition and hasten its drying. The gum of aloes will impart a yellow color to the composition, while the resinous pitch of coal-tar will impart a brown tinge to the mixture. I do not, however, limit myself to the gum-resins specified, for any other gums having a sufficient intensity of natural coloring and capable of being dissolved in alcohol or in benzole may also be employed, all such gums being soluble in the oily element of the composition.

The application of the composition may be effected either by a brush or the wood may be immersed in it. Its operation is to preserve the articles to which it is applied and to impart a pleasing color to them. It is very penetrating in its nature, and therefore unequaled in permanency of color and in preserving effect, being superior in these respects to the ordinary paints. Inasmuch as the composition is entirely absorbed by the wood-work, no skin is formed upon the surface thereof. On the other hand, the uses of oil-paints, especially those prepared with linseed-oil, result in the formation of a skin, which causes the retention of moisture under the wood-work.

So far from marking or concealing the grain of the wood, the effect of the composition is to bring it out or develop it, thereby imparting to the wood-work the appearance of having been treated in detail.

The price of the composition is much less than that of oil-paints. It also has the advantage of being mixed ready for use, whereby uniformity of color is insured. By its use new and very artistic effects in color and harmony as applied to exterior decorations may be obtained.

Having fully described my invention, what I claim as new, and desire to secure by Letters Patent, is—

A composition for staining and preserving wood, composed of rectified creosote-oil, or any of the distillates of coal-tar which pass over between 125° and 200° centigrade, about fifteen per cent. of finely-divided pigment, and about ten per cent. of drying-oil, substantially as set forth.

In testimony whereof I have signed this specification in the presence of two subscribing witnesses.

SAML. CABOT, JR.

Witnesses:
SAML. NORRIS,
ARCHIBALD M. HOWE.